(12) United States Patent
Kunz et al.

(10) Patent No.: US 8,166,120 B2
(45) Date of Patent: Apr. 24, 2012

(54) CONTENT CHANNELS FOR ELECTRONIC MESSAGING

(75) Inventors: Micheal C. Kunz, Seattle, WA (US); Michael D. Schackwitz, Pleasanton, CA (US); Ari D Galen, Redmond, WA (US); Colin R. Anthony, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 12/414,380

(22) Filed: Mar. 30, 2009

(65) Prior Publication Data

US 2010/0250685 A1    Sep. 30, 2010

(51) Int. Cl.
*G06F 15/16* (2006.01)
(52) U.S. Cl. ............ 709/206; 709/207; 455/412.1
(58) Field of Classification Search .......... 709/206, 709/207, 217, 219
See application file for complete search history.

(56) References Cited

U.S. PATENT DOCUMENTS

| | | | |
|---|---|---|---|
| 6,549,612 B2 | 4/2003 | Gifford et al. | |
| 7,836,132 B2 * | 11/2010 | Qureshi et al. | 709/206 |
| 2002/0099775 A1 * | 7/2002 | Gupta et al. | 709/205 |
| 2004/0083265 A1 * | 4/2004 | Beringer | 709/204 |
| 2005/0210396 A1 | 9/2005 | Galli | |
| 2005/0216284 A1 * | 9/2005 | Candeloro | 705/1 |
| 2005/0257156 A1 * | 11/2005 | Jeske et al. | 715/745 |
| 2006/0242663 A1 | 10/2006 | Gogerty | |
| 2007/0005715 A1 * | 1/2007 | LeVasseur et al. | 709/206 |
| 2007/0038717 A1 | 2/2007 | Burkholder et al. | |
| 2008/0005125 A1 | 1/2008 | Gaedeke | |
| 2009/0011780 A1 * | 1/2009 | Salinas et al. | 455/466 |
| 2010/0273457 A1 * | 10/2010 | Freeman et al. | 455/412.2 |

OTHER PUBLICATIONS

Thurrott, et al., "Microsoft Proposes Standard Interface for Internet "Push" Content", retrieved at <<http://windowsitpro.com/article/articleid/16865/microsoft-proposes-standard-interface-for-internet-push-content.html>>, Mar. 12, 2007, pp. 1-2.
Vasters, Clemens., "msdn", "DasBlog: Notes from Building a Distributed .NET Collaboration System", retrieved at <<http://msdn.microsoft.com/en-us/library/aa480016.aspx>>, Jan. 2004, pp. 1-8.
"intraVnews", "RSS Feed Reader for Microsoft Outlook", retrieved at <<http://www.intravnews.com/>>, Dec. 16, 2008, pp. 1-3.
"Microsoft Office Outlook Team Blog: Using RSS Feeds in Outlook 2007", retrieved at <<http://blogs.msdn.com/outlook/archive/2008/02/08/using-rss-feeds-in-outlook-2007.aspx>>, Dec. 16, 2008, pp. 1-10.

* cited by examiner

*Primary Examiner* — Mohamed Ibrahim

(57) ABSTRACT

Techniques are described to provide content channels for electronic messaging. In an implementation, a content channel may be configured to contain multiple content portions having various types of content for delivery to one or more clients. The content channel may be associated with an electronic message such as an email or instant message. The content channel and updates to the content channel may be pushed to the clients as electronic messages in an electronic messaging environment. The clients may expose a user interface having one or more portions that are arranged to present and provide interaction with the content channel. The content channel may be pinned within a designated portion of the user interface to enable repeated access to the content channel via the designated portion.

19 Claims, 8 Drawing Sheets

800 ⟶

CONTENT CHANNELS FOR ELECTRONIC MESSAGING

BACKGROUND

The popularity of social networking via online networking sites is ever increasing. One traditional technique that may be utilized to provide social networking involves publishing information (e.g., pictures, videos, text, discussion, and so forth) for a social group within webpages that are accessible over a public network, e.g. the Internet.

However, this traditional approach to social networking includes inherent privacy risks due the online publishing of group and/or user information. Further, accessing a traditional social networking site may involve a user navigating to the site, signing up for an account, and entering login information each time access is desired. As such, it may be quite inconvenient for a user to access information from a traditional social networking site. Therefore, the privacy risks and inconvenience associated with traditional social networking sites may act as barriers for some users.

SUMMARY

Techniques are described to provide content channels for electronic messaging. In an implementation, a content channel may be configured to contain multiple content portions having various types of content for delivery to one or more clients. The content channel may be associated with an electronic message such as an email or instant message. The content channel and updates to the content channel may be pushed to the clients as electronic messages in an electronic messaging environment. The clients may expose a user interface having one or more portions that are arranged to present and provide interaction with the content channel. The content channel may be pinned within a designated portion of the user interface to enable repeated access to the content channel via the designated portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
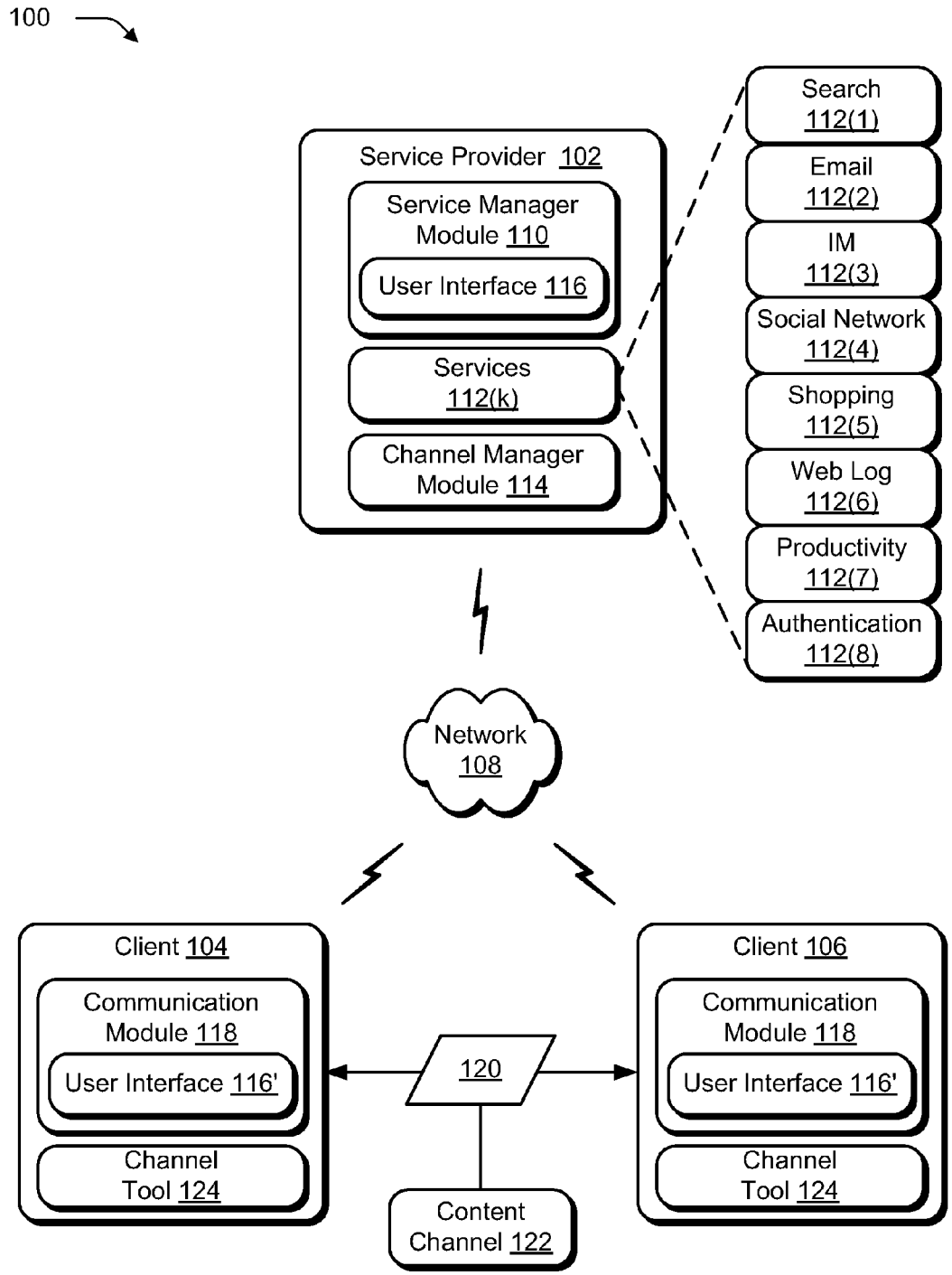
FIG. 1 is an illustration of an environment in an example implementation that is operable to provide content channel techniques for electronic messaging.

One traditional approach to accessing content on a web site involves a user navigating to the site, signing up for an account, and entering login information each time access is desired. As such, it may be inconvenient for a user to access information from a traditional web site. Further, users may be reluctant to post personal information on public web sites (e.g., social networking sites) due to privacy concerns. Accordingly, privacy concerns and inconvenience associated with traditional web sites may detract from the user experience and/or prevent some users from even using the sites.

Content channels are described that enable configuration and delivery of "rich" content through an electronic messaging environment. The content channels may be configured much like webpages and may be delivered using electronic messages. As such, content channels may combine authoring aspects of webpages with distribution aspects of electronic messaging to create techniques to deliver "rich" content that is pushed to clients. As used herein, "rich" content may refer to content channels configured to integrate and arrange a variety of types and portions of content. By way of example, content integrated to form a content channel may include text, images, video, blogs, message boards, feeds, applets, and scripts, to name a few.

In contrast to traditional electronic messages, content associated with a content channel may be configured to automatically update when an author makes changes. Unlike traditional webpages, content channels and updates to the content channels may be pushed to designated recipients via email, instant messaging, personal messaging from within a social network site or other webpage, and the like. Further, portions to enable interaction with content channels may be incorporated within a messaging user interface that is output by a messaging client for interaction with a messaging service, such as an email service, a personal messaging service, and/or an instant messaging service.

In an implementation a channel tool may be employed by a client to enable selection, customization, and arrangement of various types and portions of content for configuration of content channels. Content channels may be configured using hypertext transfer markup language (HTML), extensible markup language (XML), Cascading Style Sheets (CSS), JavaScript, and other suitable programming languages and/or coding techniques. In particular, a content channel may be authored using tools, techniques, and interfaces traditionally associated with creating a webpage. A content channel may then be addressed to one or more recipients using electronic messaging addresses (e.g., a distribution list).

For example, Adam may have a group of friends from college who communicate regularly by email. Adam may employ a channel tool at a client to create a content channel associated with the group. The channel tool may enable Adam to configure the content channel through an email application.

By way of example, Adam may configure the content channel to include an area to display some pictures of his friends, a message board, links associated with the college, and so forth. Adam may then compose an email message to associate with the content channel and select addresses of his college friends from his email contacts. Adam may then distribute the email and associated content channel by sending the email from his email application.

Adam's friend Brad receives the email, which may be presented within a user interface of his email client. For example, Adam's email may appear in Brad's inbox with an indication that it corresponds to a content channel. In one example, the indication may be an icon that is selectable to subscribe to the content channel. Brad may select Adam's email to view and/or obtain the associated content channel. For instance, responsive to Brad's selection, the content channel may be presented in a message display portion of Brad's email client. Brad may select the icon or otherwise interact to subscribe to Adam's content channel. By doing so, the content channel may be "pinned" to a content channel location within Brad's email client. For example, the content channel may appear as an item in a content channel list each time Brad use his email client. When Adam (or another friend) updates content of the content channel, the update may be pushed to Brad and/or an indication of the new content may appear with the item in the content channel list.

In the discussion that follows, a section entitled "Example Environment" describes an example environment and devices, which may be employed to provide content channels in various embodiments. Following this, a section entitled "Example Procedures" describes example techniques related to content channels for electronic messaging in accordance with one or more embodiments. After that, a section entitled "Example User Interfaces" describes example messaging user interfaces which may be configured to provide interaction with content channels. Last, a section entitled "Example Devices" is provided and describes example devices that may be used to implement one or more embodiments.

Example Environment

FIG. 1 is an illustration of an example environment 100 that is operable to provide content channels for electronic messaging. The illustrated environment 100 includes one or more service providers 102, one or more clients 104, and one or more clients 106 that are communicatively coupled, one to another, over a network 108. For purposes of the following discussion, a referenced component, such as client 104, may refer to one or more entities, and therefore by convention reference may be made to a single entity (e.g., the client 104) or multiple entities (e.g., the clients 104, the plurality of clients 104, and so on) using the same reference number.

The clients 104 and clients 106 may be configured in a variety of ways for communicating one to another and/or for accessing one or more service providers 102. Clients 104 and 106 may represent various devices suitable to perform messaging via one or more messaging systems. For example, the clients 104 and 106 may be configured as a computer, such as a desktop computer, a mobile station, a laptop, an entertainment appliance, a multimedia device, a set-top box communicatively coupled to a display device, a wireless phone, a game console, and so forth. Thus, the clients 104 and clients 106 may range from full resource devices with substantial memory and processor resources (e.g., personal computers, game consoles) to low-resource devices with limited memory, processing and/or display resources (e.g., traditional set-top boxes, hand-held game consoles, wireless phones). For purposes of the following discussion, the clients 104 and/or clients 106 may also relate to a person and/or entity that operates the clients. In other words, one or more of the clients 104 and clients 106 may describe logical clients that include users, software, and/or devices.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The service providers 102 are each illustrated as having a respective service manager module 110. The service manager module 110 represents functionality operable by a service provider 102 to manage various services 112(k) (where "k" may be any integer from one to "K") that may be made available over the network 108. For example, service manager module 110 may manage access to services 112(k), performance of the services 112(k) (e.g., load balancing), and so on. Although illustrated separately, the functionality represented by the service manager module 110 may be incorporated within the services 112(k) themselves.

The services 112(k) may be configured in a variety of ways to provide a variety of functionality to the clients 104 and clients 106 over the network 108. For example, the services 112(k) may be configured for access via platform-independent protocols and standards to exchange data over the network 108. The services 112(k), for instance, may be provided via an Internet-hosted module that is accessed via standardized network protocols, such as a simple object access protocol (SOAP) over hypertext transfer protocol (HTTP), extensible markup language (XML), and so on.

A variety of services 112(k) are contemplated. For example, services 112(k) may include a search 112(1) service (e.g., an Internet search engine to search the Internet), an email 112(2) service to send and receive email, instant messaging 112(3) service to provide instant messaging between the clients 104 and clients 106, and an a social network 112(4) service to facilitate connections and interactions between groups of users who share common interests and activities. Social network 112(4) service may assist user in connecting to a group, provide a variety of ways for users to interact (e.g., group email, website, blog, messaging), and provide recommendations to the groups based upon shared interests and activities. Additional examples of services 112(k) include a shopping 112(5) service (e.g., "ecommerce"), a web log 112(6) service (i.e., blog), productivity 112(7) service, and authentication service 112(8).

The productivity 112(7) service may provide various productivity applications as a service, such as word processing, spreadsheets, presentations, drawings, note-taking, and so on. For example, network access may be given to a client 104 to applications that were traditionally executed locally on the client 104,itself. Therefore, execution of the applications may be performed remotely at a service provider 102 and results of the execution may be communicated over the network 108 to the clients 104.

The authentication service 112(8) may also be operable to authenticate clients 104 and clients 106 to access various services 112(k) provided by one or more of the service providers 102. Authentication service 112(8) represents functionality operable to perform various suitable authentication techniques to authenticate clients. For instance, the client 104 may provide a username and password that is authenticated by the authentication service 112(8). When the authentication is successful (i.e., the client 104 "is who they say they are"), the authentication service 112(8) may pass a token to enable access to corresponding services 112(k).

Authentication of a client 104, such as by "signing in" to an email account, may provide access to a single corresponding service provider 102 and/or service 112(k). Additionally or alternatively, a single authentication may correspond to many services 112(k), such that authentication to a single account may provide access to many service providers 102 and/or to an entire suite of services 112(k) provided by a single service provider 102. Thus, rather than authenticate separately to each individual service provider 102 or service 112(k), clients 104 may perform a "single sign-on" (e.g., perform a single verification of credentials) to access a plurality of services 112(k) from one or more of the service providers 102.

Although some examples of services 112(k) have been described, it should be apparent that a wide variety of other services 112(k) are also contemplated, such as a desktop search service, a gadget service, a chat service, a news service, an advertisement service, and so on. Services 112(k) may be provided by one or more service providers 102 in various combinations. Each of the services 112(k) may also be implemented as a standalone service.

Service providers 102 are also depicted as including a channel manager module 114. Channel manager module 114 represents functionality operable to implement aspects of techniques to provide content channels for electronic messages. For instance, functionality provided by channel manager module 114 may include, but is not limited to, configuring a content channel, enabling users to create content channels, distributing a content channel to a distribution list, causing updates to content channels, tracking content channel subscriptions, and so forth. As described above, content channels provide mechanisms to include "rich" content within messaging user interfaces configured for electronic messages. While illustrated separately, channel manager module 114 may be implemented as a component of the service manager module 110.

To enable interaction with services 112(k), the service manager module 110 may form and/or output a user interface 116 (or data sufficient to form the user interface 116) to enable client 104 and client 106 to interact with the services 112(k). Service manager module 110 may also include or make use of a channel manager module 114 to configure the user interface for content channels. In at least some embodiments, content channels may be presented within a communication user interface, such as within a user interface 116 output to provide interaction with email service 112(2), instant messaging service 112(3), a social network service 112(4), and/or other services 112(k).

Clients 104 and clients 106 are depicted as including respective communication modules 118 through which various interactions with service providers 102 and services 112(k) may occur. Examples of such interactions include but are not limited to communicating one to another, navigating content, searching and selecting web pages, accessing services 112(k), performing searches, instant messaging, email, and so on. The service manager module 110 may communicate the user interface 116 and/or data used to form the user interface 116 to the clients 104 and clients 106 via the network 108. The communication module 118 is further representative of functionality to obtain the user interface 116 or data communicated via the service manager module 110. Communication module 118 may then render a corresponding user interface 116' at the client 104. Examples of communication module 118 include an email application, an instant messaging application, and a browser, to name a few.

Communication module 118 may be further operable to enable a client 104 to form an electronic message 120 and communicate the electronic message 120 over the network to a client 106, and vice versa. Electronic messages 120 may include email, instant messages, messages sent to friends via a personal message service provided within a social network service or other service, and text messages to name a few examples. As depicted in FIG. 1, an electronic message 120 may incorporate or otherwise be associated with a content channel 122. In accordance with techniques described herein, electronic messages 120 may be configured to distribute content channels 122 and/or invitations to obtain/subscribe to content channels 122.

Clients 104 and clients 106 are also depicted as including respective channel tools 124. The channel tool 124 represents functionality operable on the "client-side" to implement aspects of techniques to provide content channels 122 for electronic messages. For instance, functionality provided by channel tool 124 may include, but is not limited to, configuring a content channel 122, enabling users to create content channels 122, subscribing to content channels 122, distributing a content channel 122 to a distribution list, receiving and processing updates to content channels 122, and so forth. While illustrated separately, channel tool 124 may be implemented as a component of the communication module 118. Further discussion of techniques to enable content channels 122 may be found in relation to the following figures.

Figure 2:
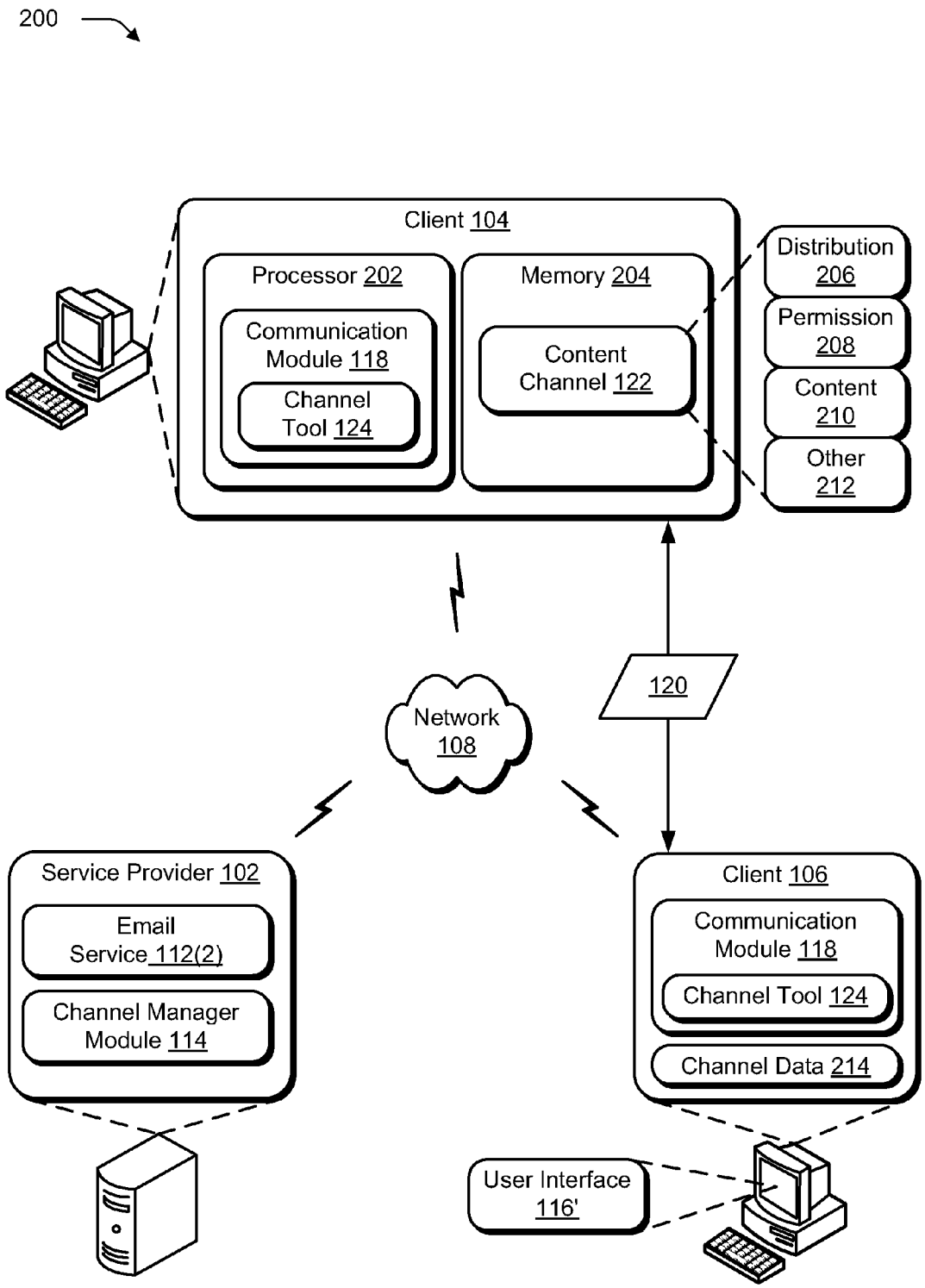
FIG. 2 is an illustration of a system in an example implementation showing clients and service providers of FIG. 1 in greater detail.

FIG. 2 is an illustration of a system 200 in an example implementation showing a service provider 102, client 104, and client 106 of FIG. 1 in greater detail. The system 200 may be configured as a messaging system to enable electronic messages to be communicated via various messaging devices. In FIG. 2, the service provider 102 is illustrated as being implemented by one or more servers and the clients 104 and 106 are illustrated as client devices. For example, the client 104 is depicted as a messaging device that includes a processor 202 and memory 204. Service provider 102 and client 106 may also be implemented as devices that each includes one or more processors and memory. A further discussion of example devices may be found below in a section titled "Example Devices".

In the example system 200, communication module 118 is depicted as being executed via the processor 202 and is also storable via the memory 204. Further, a channel tool 124 is depicted as incorporated with the communication module 118. The client 104 may make use of the channel tool 124 to configure a content channel 122 for communication to the client 106. For example, channel tool 124 may interact in various ways with channel manager module 114 of a service provider 102 to configure a content channel 124. In at least some embodiments, this involves creating various data to define the content channel 122.

A variety of channel data to define a content channel 122 is depicted as being stored with a content channel 122 in the memory 204. Examples of data that may define a content channel 122 include, but are not limited to, distribution 206 data that may describe one or more recipients and/or messaging addresses, permission 208 data that designates access and/or interaction permissions (e.g. view, edit, post), and content 210 data to define content selections and arrangement for a content channel 122. A variety of other 212 data is also contemplated, such as a content channel identifier, author/owner data, one or more data fields or flags detectable by a client 106 to determine that a received electronic message contains or corresponds to a content channel 122, delivery preferences, and so forth.

A client 104 may make use of email service 112(2) from a service provider 102 to distribute a content channel 122 as an electronic message 120 (e.g., an email) to designated recipients. In at least some embodiments, the electronic message 120 includes content 210 data for the associated content channel 122. Additionally or alternatively, at least some portions of the content 210 data for a content channel 122 may be distributed separately from a corresponding electronic message 120. Channel manager module 114 may operate to manage how and/or when content channels 122 and associated content 210 data are distributed to a client 106 designated to receive the content channel 122. For example, an electronic message 120 may be configured to enable a client 106 receiving the message to subscribe to an associated content channel 122. Rather than sending content 210 data with a distributed electronic message 122, channel manager module 114 may track subscribers to the content channel 122 and push or otherwise communicate associated content 210 data to the subscribers separately from the electronic message 120.

Client 106 is depicted in FIG. 2 as storing channel data 214. The channel data 214 of client 106 represents data describing content channels 122 and/or associated data that have been communicated by the client 104 and received by the client 106. Channel data 214 may also describe subscriptions to various content channels 122, display preferences, customizations, and so forth. Channel tool 124 may make use of the channel data 214 to configure a user interface 116' to enable interaction with content channels 122. In at least some embodiments, the channel data 214 is stored locally at the client 106. By so doing, deficiencies associated with posting channel data 214 and/or user information publicly, such as within a traditional posted web page, may be avoided.

Having considered examples of an environment, systems, and devices, example procedures are described for content channels that may be implemented using the example environment, systems, and devices.

Example Procedures

The following discussion describes content channel techniques for electronic messaging that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and/or the system 200 of FIG. 2.

Figure 3:
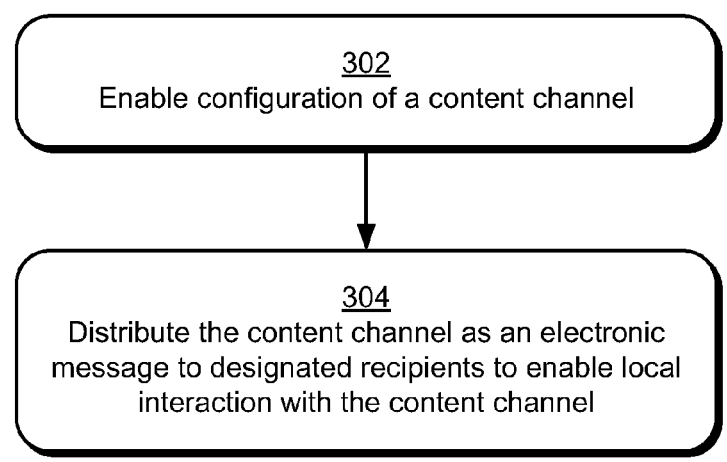
FIG. 3 is a flow diagram depicting a procedure in an example implementation in which content channels are distributed by a service provider.

FIG. 3 depicts a procedure 300 in an example implementation in which content channels are distributed by a service provider. In at least some embodiments, procedure 300 may be performed by a suitably configured service provider, such as service provider 102 of FIG. 1 having a channel manager module 114.

Configuration is enabled of a content channel (block 302). For example, channel manager module 114 of a service provider 102 may enable various interactions of a client 104 to configure content channels through a user interface 116. The user interface 116 may represent a messaging user interface, such as an interface exposed to provide interaction with email service 112(2). Channel manager module 114 may present various configuration options via the user interface 116. For example, the channel manager module 114 may enable a selection of preconfigured content portions, channel templates, images, icons, modules, applets, scripts, and so forth to include in a content channel 122. Channel manager module 114 may also expose tools operable to author content portions, edit and/or customize existing content selections, arrange content in various layouts, update a content channel 122, and so forth. A client 104 may communicate with the service provider 102 over a network 108 to configure a content channel 122 using the exposed interfaces, options, tools and techniques, further discussion of which may be found in relation to FIG. 4.

The content channel is distributed as an electronic message to designated recipients to enable local interaction with the content channel (block 304). For example, channel manager module 114 may receive a content channel 122 that is configured by a client 104. As part of configuring a content channel 122, the client 104 may designate one or more recipients to receive the content channel 122. This may occur by selecting email addresses or other messaging addresses from a contact list to create a distribution list. The client 104 may then perform a send operation to send the content channel 122 to the service provider 102 and cause distribution of the content channel 122.

The channel manager module 114 may operate to receive the content channel 122, determine the selected recipients from the distribution list, and distribute the content channel as an electronic message 120 to the recipients. In one example, a content channel 122 may be configured as part of an electronic message 120 that is formed by the client 104. Additionally or alternatively, an association between the content channel 122 and an electronic message 120 may be formed by the client 104 or by the channel manager module 114.

Distribution of the content channel 122 may then occur in various ways. In one example, the electronic message 120 may be configured to contain the content channel 122 for output by a recipient. In another example, the electronic message 120 may be configured to notify a recipient of and/or enable access to the content channel 122.

Accordingly, content corresponding to a content channel 122 may be pushed to a client 106 with or separately from the electronic message 120. In each case, data corresponding to a content channel 122 may be pushed to each recipient and stored locally to enable local access. For instance, channel data 214 of client 106 in FIG. 2 may represent locally stored data for content channels 122. Accordingly, distribution of content channels 122 may occur without posting corresponding data publicly or maintaining the data on a publicly accessible server, which may reduce privacy risks and concerns.

Figure 4:
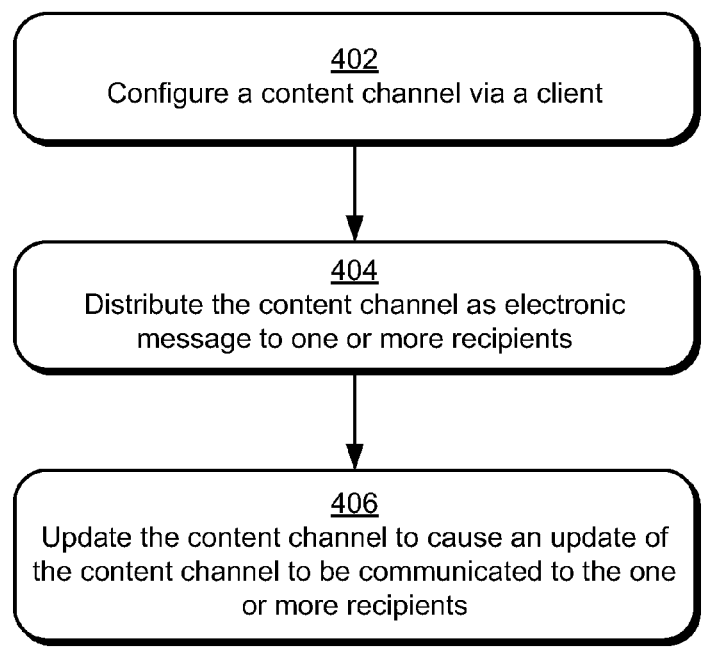
FIG. 4 is a flow diagram depicting a procedure in an example implementation in which a client configures a content channel.

FIG. 4 depicts a procedure 400 in an example implementation in which a client configures a content channel. In at least some embodiments, procedure 400 may be performed by a suitably configured client, such as a client 104 or a client 106 of FIG. 2 having a channel tool 124.

A content channel is configured via a client (block 402). For example, a client 104 as depicted in FIG. 2 may execute a channel tool 124 to configure a content channel 122. This may involve interaction over the network 108 with a channel manager module 114 of a service provider 102. In at least some embodiments, the channel tool 124 may be implemented as a component of a communication module 118, such as an email application or browser. For instance, the client 104 may execute the communication module 118 to obtain a user interface 116 exposed by the service provider 102 and output a corresponding user interface 116' that is operable to configure content channels 122 using the channel tool 124. The channel tool 124 may also be configured as a standalone application.

The channel tool 124 may enable content channels 122 to be configured via a client using a markup language such as hypertext transfer markup language (HTML) or extensible markup language (XML), Cascading Style Sheets (CSS), JavaScript, and/or other suitable programming languages and coding techniques. In particular, a content channel 122 may be authored using tools, techniques, and interfaces traditionally associated with creating a webpage.

A service provider 102 may expose various configuration options that are selectable to perform the configuration as discussed in relation to FIG. 3. Channel tool 124 may be operable to access the configuration options in various ways for configuration of a content channel 122. For example tools, templates, content portions, and/or other configuration options may be accessed by communication with the service provider 102 over a network 108. In this example, configuration of a content channel 122 may occur by back and forth communication between the channel tool 124 of a client 104 and one or more servers of a service provider 102, e.g., network execution over the network 108. Channel tool 124 may also enable downloading of various configuration options to a client 104 for local execution.

Consider an example scenario in which Mike just had a new baby. Mike may wish to share memories of his newborn with a social network of friends and family. To do so, Mike may create a "Mike's Baby" channel using techniques describes herein. Mike may make use of an email application or other communication module 118 having an associated channel tool 124 to create his channel. For instance, when Mike goes to compose an email using his email application, an option to create a content channel 122 may be presented by operation of the channel tool 124. By selecting this option, Mike is able to access a variety of configuration options to author a content channel 122 including a variety of content. For example, Mike may include and arrange images, captions, and a blog for his "Mike's Baby" channel. "Mike's Baby" channel may also include interactive and dynamic content such as a video applet, a slide show applet, and a group discussion thread section. To create the content channel 122, Mike may select preconfigured content portions available via the channel tool 124 and/or author custom content portions for his content channel 122.

The content channel is distributed as an electronic message to one or more recipients (block 404). In the preceding example, Mike may address and send his "Mike's Baby" channel to friends and family in a familiar way using his email application. For instance, Mike may access his contact list and select messaging addresses for his parents, his brother, and some friends to create a distribution list. Mike hits send and an electronic message 120 is sent to distribute his content channel 122 to his selected friends and family members. The content channel 122 may be configured as part of the electronic message 120, or as a payload associated with the electronic message 120. Accordingly, the content channel 122 may be communicated to the recipients with the electronic message 120 or as a payload separate from the electronic message 120. Various interaction may occur with a content channel 122 when received by a client 104 or client 106, further discussion of which may be found in relation to FIG. 5.

The content channel is updated to cause an update of the content channel to be communicated to the one or more recipients (block 406). For instance, channel tool 124 may be operable to update a content channel 122 that has been previously sent. The content channel 122 may be accessed and edited in various ways via the channel tool 124. This may include adding content, changing content portions, rearranging layout of a content channel 122, and so forth. Updating may also include adding or removing recipients. When an update occurs, the channel tool 124 may push the updated content channel 122 to the one or more recipients. In at least some embodiments, the push of an update to the recipients occurs automatically and without user action to send the update. Additionally or alternatively, an option selectable to send an update may be exposed in response to user action to update the content channel 122.

For example, when Mike creates his "Mike's Baby" channel, the channel may be "pinned" within a user interface for his email application. Mike may choose to update his "Mike's Baby" content channel frequently with new baby pictures and comments. To do so, Mike may access the "Mike's Baby" channel via his email application and make changes using the associated channel tool 124. After completing the update, Mike selects send to cause the update for his "Mike's Baby" content channel to be communicated to Mike's friends and family members. Alternatively, Mike may configure the channel tool 124 to send updates for "Mike's Baby" channel and/or other content channels 122 automatically in response to changes and without Mike having to perform a send action.

Note that a content channel 122 may include one or more interactive portions that may be updated by recipients. For example, a content channel 122 may be configured to allow recipients to add photos, make discussion section entries, comment on videos, and so forth. As with updates that are made by an author/owner of a content channel 122, updates made by recipients may also be pushed to other recipients and/or to the author/owner using the distribution list for the content channel 122.

Permission 208 data associated with a content channel 122 may be configured to control who is able to perform updates, what content may be updated, and so forth. An author of a content channel 122 may configure permission 208 data when the content channel is created and changes permissions thereafter. Permissions may be controlled using the messaging addresses for the recipients (e.g., the distribution list) and/or associated user accounts. For example, a client that is authenticated to use a particular email account may have associated permissions set for an email address of the account with respect to a particular content channel 122. Thus, Mike may give his mom permission to upload photos to the "Mike's Baby" channel, and each friend and family member may have permission to add to the discussion thread. Of course, Mike has permission as an author to update the "Mike's Baby" channel as he chooses.

In at least some embodiments, recipients of a content channel 122 may choose whether to subscribe to the content channel 122. In this case, subscribers to the content channel 122 may be identified and/or tracked. For example, service provider 102 may make use of a channel manager module 114 to store data indentifying subscribers to a content channel 122. In this manner, the service provider 102 may keep track of subscriptions and/or subscribers. Updates to content channels 122 may be selectively pushed based on the subscriptions. Thus, when an update to a content channel 122 occurs, channel manager module 114 may communicate the update to the subscribers and not to non-subscribers.

Figure 5:
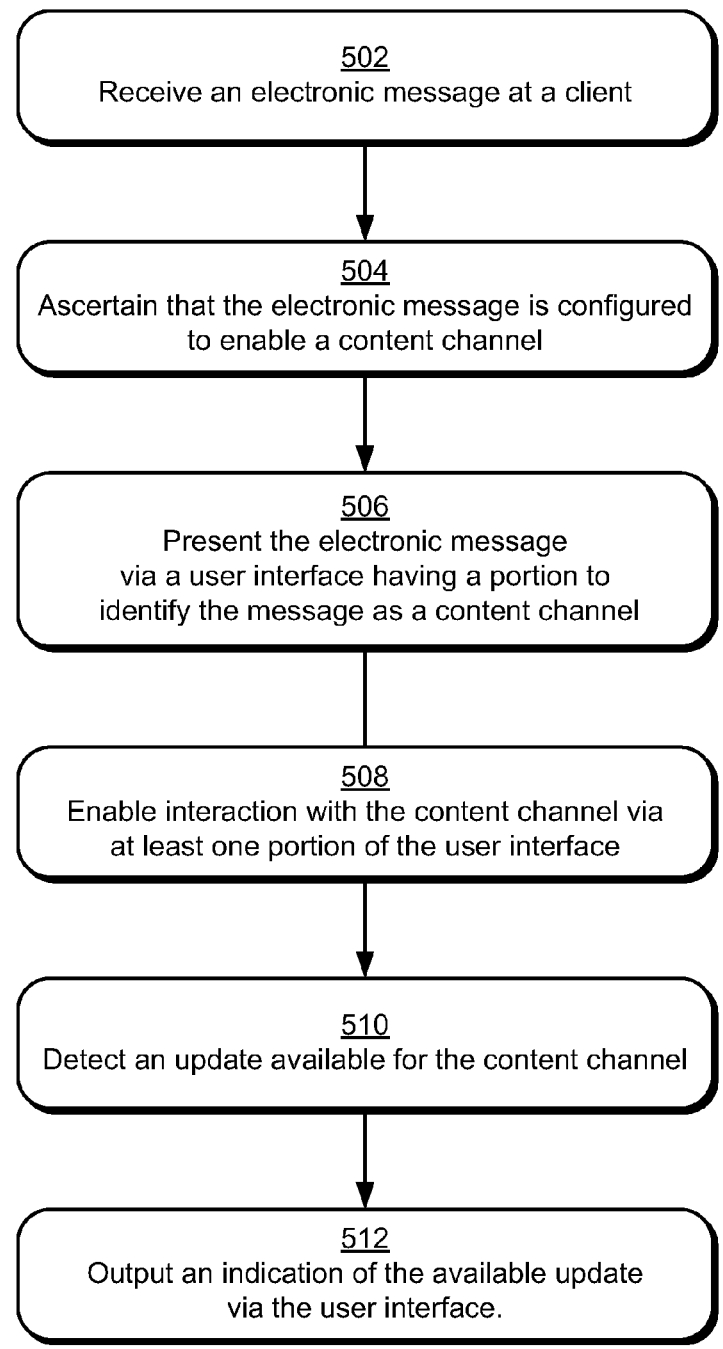
FIG. 5 illustrates a procedure in an example implementation in which a client receives and interacts with a content channel.

FIG. 5 depicts a procedure 500 in an example implementation in which a client receives and interacts with content channels. In at least some embodiments, procedure 500 may be performed by a suitably configured client, such as client 104 or client 106 of FIG. 2 having a channel tool 124.

An electronic message is received at a client (block 502). This may occur by execution of a communication module 118 of a client 106 to obtain services 112(k) from a service provider 102. In particular, the client 106 may obtain messaging service, such as email 112(2) service and/or instant messaging 112(3) service. Various electronic messages 120 may be obtained via the service provider 102 and output in a user interface 116', such as displaying of messages in an email inbox.

The client ascertains that the electronic message is configured to enable a content channel (block 504). For example, at least some of the electronic messages 120 received by a client 106 may be associated with content channels 122. These may include electronic messages 120 configured as a content channel 122 and/or those configured to enable access to an associated content channel 122. Communication module 118 may include or otherwise make use of a channel tool 124 to ascertain which received messages are configured to enable content channels 122. One way this may occur is by detecting data embedded with the message to indicate that the message is associated with a content channel 122. Various flags, fields, identifiers and/or other suitable data may be employed and detected by a client 106 to enable identification of content channels 122.

The electronic message is presented via a user interface having a portion to identify the message as a content channel (block 506) and interaction with the content channel is enabled via a least one portion of the user interface (block 508). For instance, when channel tool 124 ascertains that a message is associated with content channel 122, the message may be processed and displayed accordingly. This may include outputting indications via user interface 116' to identify content channels 122 to users. For example, an icon or other suitable identifier may be placed next to or otherwise in proximity to the message in an inbox list.

Further, various interaction with content channels 122 may be enabled via the user interface 116'. For example, a content channel list portion of the user interface 116' may be exposed that lists new and/or active content channels. When a content channel 122 is selected, the associated content may be output in a message display portion of the user interface 116'. Further, an option to subscribe to a content channel 122 may be exposed in the user interface 116'. For instance, a "subscribe" link operable to subscribe to a content channel 122 may appear with the message in the inbox and/or in the content channel list portion. Subscribing to the content channel 122 may cause the content channel 112 to be "pinned" within a portion of the user interface 116'. For example, a content channel item corresponding to the content channel 122 may appear in the content channel list portion. A user may then access the content channel 122 via the portion to which the content channel 122 has been "pinned". This access may occur repeatedly during current and future sessions with the user's messaging service. Additional discussion regarding messaging user interfaces configured to enable interaction with content channels may be found in the section below titled "User Interface Examples".

An update available for the content channel is detected (block 510) and an indication of the available update is output via the user interface (block 512). As discussed, updates to a content channel 122 by an owner or by recipients may be pushed to a distribution list. A channel tool 124 at a client 106 may operate to detect when updates are available. In one example, the channel tool 124 receives and processes an update message corresponding to a content channel 122 that was previously received. In another example, channel tool 124 may operate to periodically check for available updates from the service provider 102. When an update is available of a content channel 122, the channel tool 124 may operate to reflect the availability of the update via the user interface 116'. One way this may occur is by using a status identifier, such as an icon or emphasized text, to indicate that new content or other updates to a content channel 122 are available.

For example, electronic messages 120 associated with content channels 122 may be indicated as new using various techniques when they are initially received, such as by emphasis of a subject line or use of a status identifier. The new indication may disappear following interaction with the message. With content channels 122, channel tool 124 may cause these indications to reappear when someone updates a content channel 122. For example, content channel items in a portion to which content channels 122 have been "pinned" may be selectively changed from having standard text to bold text to reflect when new content is available. Alternatively, an icon or other identifier may appear, disappear, and reappear with a "pinned" item to reflect when new content is available for a corresponding content channel 122.

Consider again the foregoing example of the "Mike's Baby" channel that Mike distributes to friends and family. When Mike's mom opens her email application, Mike's content channel message may appear in her inbox. The message may have a bold subject line to indicate that the message is new. A subscribe link and/or a content channel identifier (e.g., an image or icon) may appear in the inbox next the subject line. When Mike's mom chooses to subscribe, the "Mike's Baby" channel is "pinned" within the user interface for her email application, such as by listing a "Mike's Baby" item in a content channel list portion of the user interface. Mike's content channel message may also be removed from her inbox. Mike's mom may then select the content channel 122 and view the content that Mike configured in a message display portion of the user interface. When Mike (or someone else) updates the "Mike's Baby" content channel, the "Mike's Baby" item included in the content channel list portion of the user interface may appear bold or appear with another suitable status identifier to indicate to Mike's mom that new content is available.

Having considered examples procedures related to content channels, consider now example user interfaces that may be employed to provide interaction with content channels in one or more embodiments.

Example User Interfaces

Figure 6:
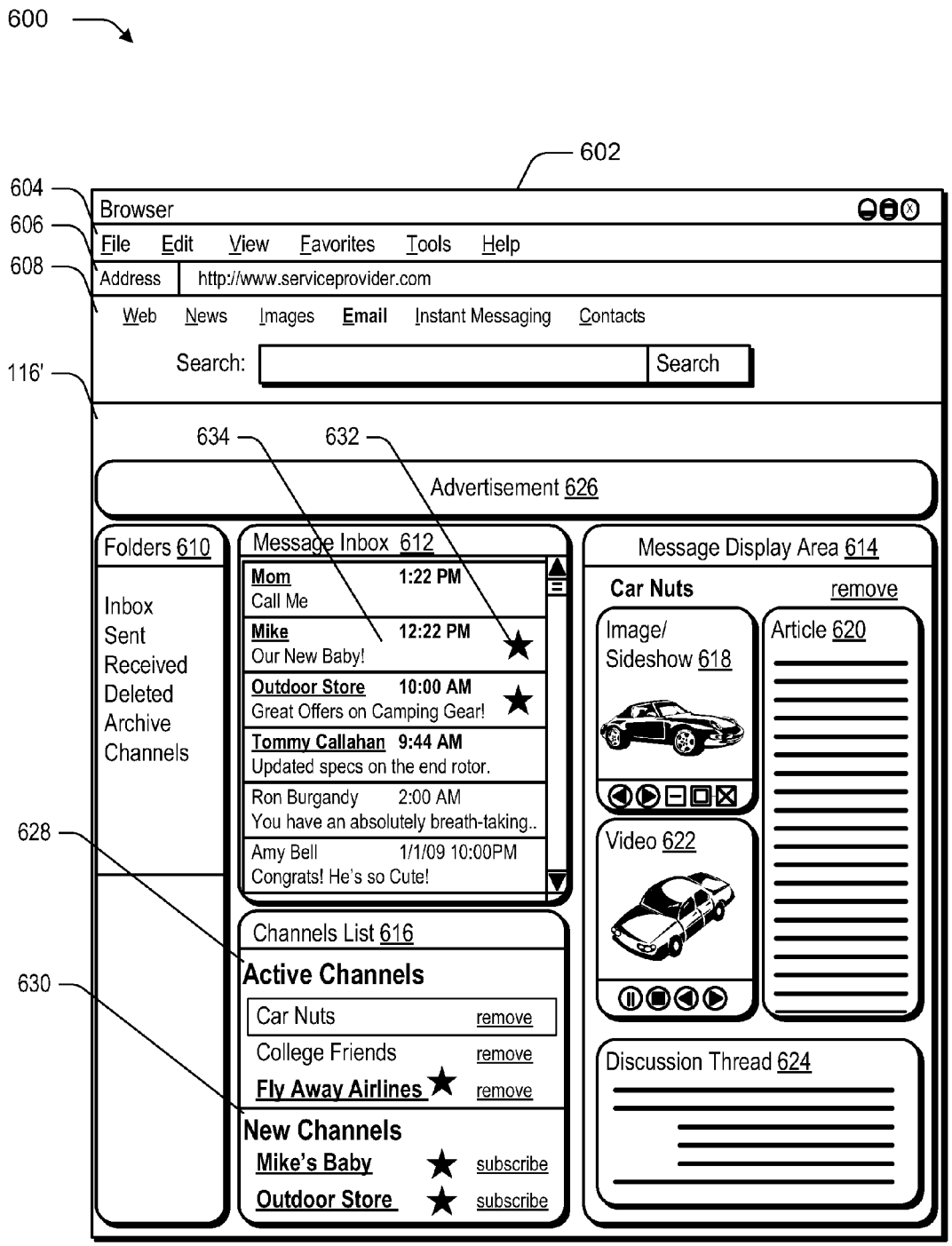
FIG. 6 is an illustration of an example user interface having content channel portions in accordance with one or more embodiments.

Referring now to FIG. 6, an implementation 600 is illustrated showing an example user interface 116' that includes one or more portions to enable interaction with content channels. The user interface 116' in this instance is illustrated as incorporated within a user interface 602 that may be provided by the communication module 118. For example, the communication module 118 may be configured as a browser operable to expose the user interface 602 to enable interaction with one or more service providers 102 and corresponding services 112(k).

To provide the interaction with services 112(k), the user interface 602 includes a menu bar 604, an address bar 606, and a search bar 608. The menu bar 604 is a portion of the user interface 602 that includes drop-down menus of commands, examples of which are illustrated as "file", "edit", "favorites", "tools" and "help". The address bar 606 is configured to receive inputs to navigate to particular network addresses and/or display current network addresses, from which, the client 106 has received content that is being displayed. The search bar 608 may be operable to conduct a variety of searches including searches for webpages, images, news, and so forth.

In the example of FIG. 6, the user interface 116' within the user interface 602 of a browser is configured as an email client to enable interaction of a client 106 with email 112(2) service. A comparable user interface 116 may also be configured for interaction with instant messaging 112(3) service, web log 112(6) service, and/or other services 112(k). Although depicted as being part of the user interface 602 of a browser, a user interface 116' may also be provided by a standalone applications of the client 106, such as a standalone email client, an instant messaging client, a personal information management program, or a desktop social networking application, to name a few. In each case, the user interface 116' may make use of a channel tool 124 to enable various interaction with content channels 122.

In particular, the user interface 116' includes a folder list 610 to organize and manage messages, a message inbox 612 to display a list of received messages, a message display area 614 that may be configured to display content of a selected message, and a channel list 616 that may be configured to provide various interactions with content channels 122.

The message display area 614 may be configured to display traditional emails, as well as content channels 122. In the depicted example, the message display area 614 presents a "Car Nuts" channel. Using techniques described herein, the "Car Nuts" channel may be configured to include and arrange various content portions related to cars. A few example content portions are illustrated including an image/slideshow 618 portion to present images, an article 620 portion to provide text, news, stories, and the like, a video 622 portion, and a discussion thread 624. User interface 116' may also include one or more advertisements, such as the depicted advertisement 626. In at least some embodiments, one or more advertisements 626 may be included as portions of a content channel 122.

The channel list 616 may be configured to output a list of content channels 122 within a dedicated area of the user interface 116'. In this manner, content channels 122 may be presented and interacted with via a dedicated channel portion that may appear separate from the inbox, other messages, and/or other portions of the user interface 116'. The channel list 616 may include one or more portions to arrange a list of content channels in various ways. For instance, the example channel list 616 includes an active channel list 628 and a new channel list 630. The active channel list 628 may represent content channels 122 to which a user has subscribed and are accordingly "pinned" to the active channel list 628. "Pinned" channels may continue to appear within the channel list 616 each time the user interface 116' is accessed and/or rendered.

Items in the channel list 616 may be selected to cause appearance of a corresponding content channel 122 in the message display area 614. Note that the "Car Nuts" channel appears as being selected in the active channel list 628 to cause presentation within the message display area 614. "College Friends" and "Fly Away Airlines" channels also appear in the active channel list 628. A remove control that is selectable to unsubscribe to and/or "unpin" a corresponding content channel 122, such as the depicted remove links, may appear with each item in the active channel list 628 list. Selection of the remove control may cause a corresponding content channel 122 to be removed from the active channel list 628.

The new channel list 630 may represent content channels 122 to which a user may choose to subscribe. A subscribe control that is selectable to subscribe to a corresponding content channel 122, such as the depicted subscribe links, may appear with each item in the new channel list 630 list. Selection of the subscribe control may cause a corresponding content channel 122 to be removed from the new channel list 630 and become "pinned" to the active channel list 628.

New and unread messages may be identified within the inbox 612 in some manner, such as by appearing bold, being underlined as depicted in FIG. 6, or otherwise being distinguished from messages that have been read. For example, messages from "Mom", "Mike", "Outdoor Store", and "Tommy Callahan" are depicted as new in the message inbox 612. Further, messages associated with content channels 122 may appear with an identifier 632 to communicate the association to a content channel 122 to users. In the depicted example, an identifier 632 configured as a star icon has been placed next to messages from "Mike" and "Outdoor Store". Other suitable identifiers 632 are also contemplated such as other icons, a subscribe link, a button, an image, and so forth. In at least some embodiments, the identifier 632 associated with a message is selectable to subscribe to an associated content channel 122. Selection of the identifier 632 appearing with a message in the message inbox 612 may cause a corresponding content channel 122 to be removed from the message inbox 612 and become "pinned" to the active channel list 628.

The identifier 632 may also be used to denote when new content is available for a content channel 122. For instance, an example identifier 632 configured as a star icon has been placed next to "Fly Away Airlines" in the active channel list 628 to denote that new content is available for this content channel 122. The star icon may appear responsive to an electronic message 120 that is pushed to a distribution list when an update to the "Fly Away Airlines" channel occurs. Note that, since the "Fly Away Airlines" channel has been "pinned", the electronic message 120 may not appear within the message inbox 612. Rather, the "Fly Away Airlines" item in the active channel list 628 is updated to reflect the availability of new content. Following interaction with the "Fly Away Airlines" channel, the star icon may be removed. The appearance and removal of an identifier 632 associated with items in the channel list 616 may occur repeatedly to reflect whether updates are available for corresponding content channels 122.

To further illustrate aspects of user interfaces for interaction with content channels, consider again the example of the "Mike's Baby" channel above. As noted, Mike may create his "Mike's Baby" channel and send an associated email to a distribution list to cause communication of the channel to friends and family, including Kyle who is one of Mike's friends. Assume that the example user interface 116' of FIG. 6 corresponds to an email client that Kyle uses for his email. Kyle may receive an email message 634 associated with "Mike's Baby" channel that appears in his message inbox 612. "Mike's Baby" channel may also appear as an item in the new channels list 630 within the channels list 616. The email message 634 appears with an identifier 632 that may be selectable to subscribe to "Mike's Baby" channel. In particular, a channel tool 124 may detect that the email message 634 from Mike corresponds to a content channel 122 and in response cause the identifier 632, e.g. star icon, to appear in the inbox and/or adds the "Mike's Baby" channel item to the new channels list 630 with a subscribe option. Since new content is available for "Mike's Baby" channel, the identifier 632 may also appear with the "Mike's Baby" channel item in the new channels list 630.

Assume further that Kyle interacts with the user interface 116' to subscribe to "Mike's Baby" channel. He may do so by selecting the star icon that appears in the inbox 614, selecting the "Mike's Baby" channel item in the new channels list 630, selecting the subscribe option, through interaction with the menu bar 604, or in another suitable way. By subscribing, Kyle causes "Mike's Baby" channel to be "pinned" to the user interface 116' he uses for his email. In particular, subscribing to a content channel 122 may cause a corresponding update to be reflected in the user interface 116' as illustrated by comparison of FIG. 6 and FIG. 7.

Figure 7:
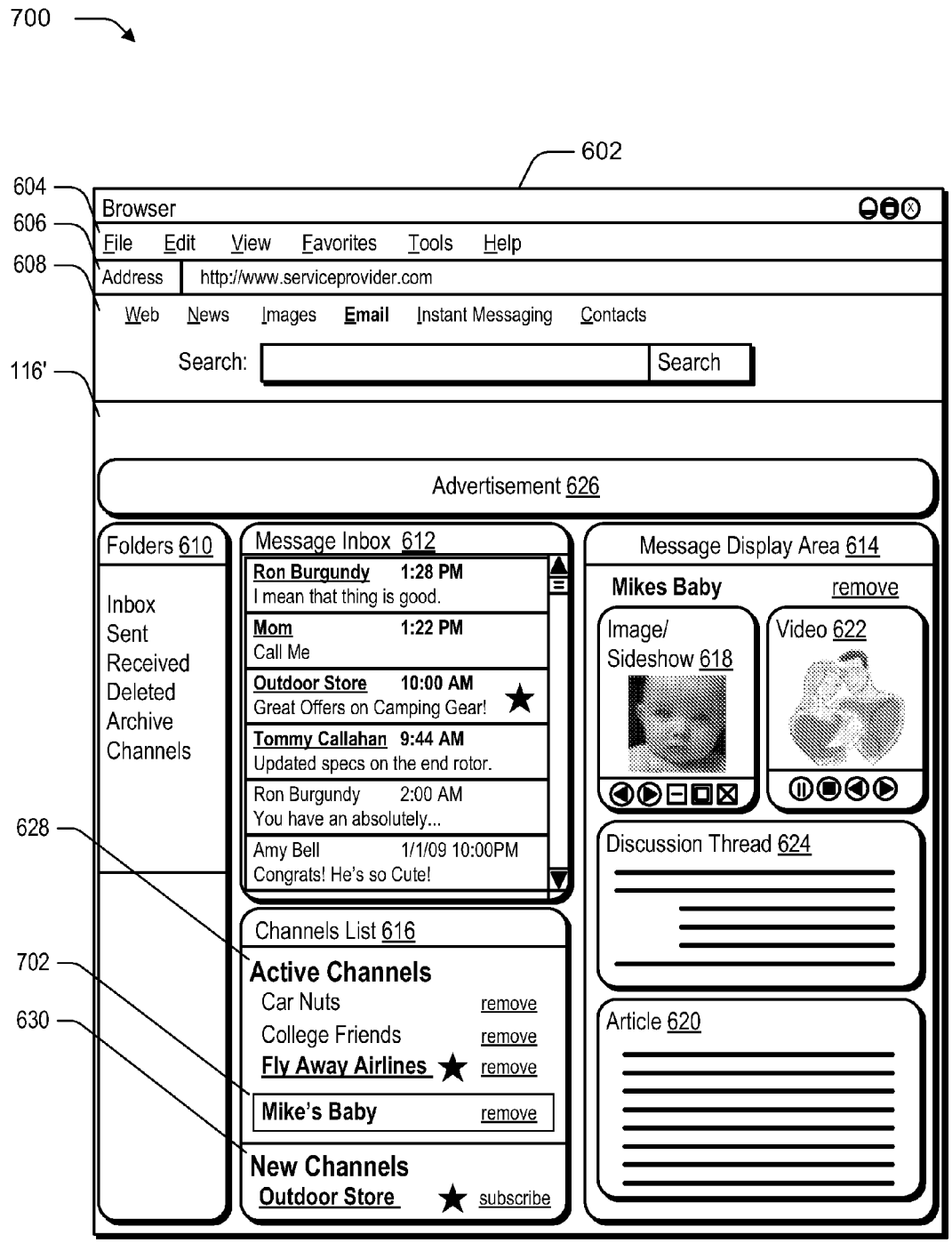
FIG. 7 is an illustration of another example user interface having content channel portions in accordance with one or more embodiments.

Referring now to FIG. 7, an example implementation 700 is depicted showing the user interface 116' of FIG. 6 following interaction to subscribe to a content channel 122. For example, FIG. 7 illustrates the user interface 116' which has been updated to reflect Kyle's interaction to subscribe to "Mike's Baby" channel. Note that the email message 634 has been removed from the message inbox 612 and from the new channels list 630. Further, "Mike's Baby" channel appears as a content channel 122 that is "pinned" to the active channel list 628.

The "Mike's Baby" channel is illustrated as being selected to cause corresponding content portions to appear in the message display area 614. Observe that content portions in "Mike's Baby" channel have been rearranged relative to the "Car Nuts" channel of FIG. 6 in accordance with an arrangement Mike may have selected when configuring the "Mike's Baby" channel. Moreover, different content portions may be configured to appear and disappear when different content channels 122 are selected. Accordingly, a selection of different content channels 122 may cause a corresponding change in a user interface 116', as illustrated in FIG. 6 and FIG. 7.

Reflect upon the various example content channels 122 appearing in FIG. 6 and FIG. 7. These include some content channels 122 that may correspond to social networks of people having common interests, relationships, and so forth. For example, "Mike's Baby" channel is organized around a group of Mike's friends and family. The "College Friends" channel may correspond to a group of friends who attended college together and utilize the content channel 122 to keep in touch. Likewise the "Car Nuts" channel may correspond to a social network of people connected through their common interest in cars. In the social networking context, content channels 122 may enable the kind of interaction that is available through social networking sites and that is conveniently available by delivery of electronic messages 120 to users in their inboxes. Moreover, by delivering content channels 122 via electronic messaging between clients 104 and clients 106, concerns with posting information on public websites may be avoided.

Some content channels 122 may also correspond to business entities such as merchants, advertisers, service providers, and the like. In the business context, content channels 122 may provide new mechanisms for advertising products, delivering product information, distributing sales and special offers, providing product support, obtaining registration and/or demographic data, and so forth.

For example, an outdoor equipment retailer may configure an "Outdoor Store" channel and deliver it via an electronic message 120. Note that an email message corresponding to the "Outdoor Store" channel appears in the message inbox 612 in FIGS. 6 and 7. The "Outdoor Store" channel may be configured as a periodic newsletter and/or sale flyer that may be sent directly to subscribers. Rather than clog the inboxes of the subscribers, the "Outdoor Store" channel may be "pinned" to the channel list 616 of a subscriber. An identifier 632 may then appear next to the "Outdoor Store" channel in the channel list 616 whenever the newsletter is updated. In another example, the "Fly Away Airlines" channel depicted in FIGS. 6 and 7 may be sent by an airline company to participants in a frequent flyer program. The "Fly Away Airlines" channel may contain travel promotions, travel information, airline notices, links to the airline web site, advertisements from advertisers, and so forth. Thus, content channels 122 corresponding to business entities may be configured in various ways to provide new mechanisms for delivery of content from advertisers, merchants, service providers, and other businesses.

Having considered example user interfaces related to content channels, consider now a discussion of example devices that may be employed to provide content channels for electronic messaging in one or more embodiments.

Example Devices

Figure 8:
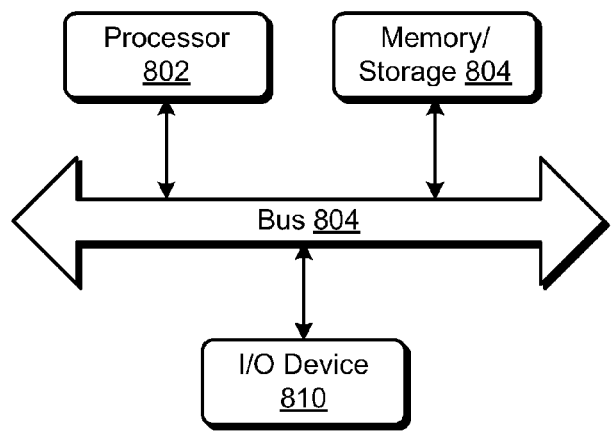
FIG. 8 is an illustration of an example device in accordance with one or more embodiments.

FIG. 8 illustrates an example computing device 800 that may implement the various embodiments described above. Computing device 800 may be, for example, clients 104 and 106 of FIG. 1, a server of a service provider 102, or another suitable computing device. The computing device 800 may be configured as a messaging device that is capable of sending, receiving, and/or distributing various electronic messages 120 via one or more messaging systems, such as the example system 200 of FIG. 2 or in the environment of FIG. 1.

Computing device 800 includes one or more processors or processing units 802, one or more memory and/or storage components 804, one or more input/output (I/O) devices 806, and a bus 808 that allows the various components and devices to communicate one to another. The bus 808 represents one or more of several types of bus structures, including a memory bus or memory controller, a peripheral bus, an accelerated graphics port, and a processor or local bus using a variety of bus architectures. The bus 808 may include wired and/or wireless buses.

Memory/storage component 804 represents one or more computer storage media. Memory/storage component 804 may include volatile media (such as random access memory (RAM)) and/or nonvolatile media (such as read only memory (ROM), Flash memory, optical disks, magnetic disks, and so forth). Memory/storage component 804 may include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media may include a variety of available medium or media that may be accessed by a computing device. By way of example, and not limitation, computer-readable media may comprise "computer-readable storage media".

Software or program modules, including the channel tool 124, channel manager module 114, and other program modules, may be embodied as one or more instructions stored on computer-readable storage media. Computing device 800 may be configured to implement particular functions corresponding to the software or program modules stored on computer-readable storage media. Such instructions may be executable by one or more articles of manufacture (for example, one or more computing devices 800, and/or processors 802) to implement techniques for content channels, as well as other techniques. Such techniques include, but are not limited to, the example procedures described herein. Thus, computer-readable storage media may be configured to store instructions that when executed by one or more device of a messaging environment or system cause various techniques for content channels.

Computer-readable storage media includes volatile and non-volatile, removable and non-removable media implemented in a method or technology suitbale for storage of information such as computer-readable instructions, data structures, program modules, or other data. Computer-readable storage media may include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

Conclusion

Although the content channel techniques have been described in language specific to structural features and/or methodological acts, it is to be understood that the appended claims are not necessarily limited to the specific features or acts described. Rather, the specific features and acts are disclosed as example forms of implementing the content channel techniques.

What is claimed is:

1. A messaging device comprising:
   one or more processors and memory; and
   one or more modules stored in the memory and executable via the one or more processors to:
      receive an electronic message associated with a content channel;
      output a messaging user interface having an inbox to present the electronic message along with other electronic messages for a particular messaging account;
      expose an identifier in the inbox with the electronic message to visually identify the association of the electronic message with the content channel, the identifier selectable to configure the messaging user interface to include a link for repeated access to the content channel and output indications of updates available for the content channel; and
      responsive to selection of the identifier, pin the content channel as an item in a content channel list of the messaging user interface such that the content channel appears as an item in the content channel list each time the messaging user interface is used to access the particular messaging account.

2. A messaging device as described in claim 1, wherein the content channel is configured to integrate multiple content portions of different types and define arrangement of the multiple content portions one to another for display via a message display area of the messaging user.

3. A messaging device as described in claim 2, wherein at least some of the multiple content portions are received by the messaging device as part of the electronic message.

4. A messaging device as described in claim 2, wherein at least some of the multiple content portions are obtained by the messaging device separately from receiving the electronic message.

5. A messaging device as described in claim 2, wherein the multiple content portions include an interactive portion operable to update content of the content channel and cause automatic communication of the update to one or more subscribers to the content channel.

6. A messaging device as described in claim 1, wherein the content channel is configured to integrate and arrange multiple content portions of different types using one or more markup languages.

7. A messaging device as described in claim 1, wherein the electronic message is an email.

8. A messaging device as described in claim 1, wherein the electronic message is an instant message.

9. A messaging device as described in claim 1, wherein the identifier is selectable to subscribe to the associated content channel.

10. A messaging device as described in claim 1, wherein the identifier is an icon.

11. A messaging device as described in claim 1, wherein the identifier is a selectable link operable to cause display of the associated content channel in a message display area of the messaging user interface.

12. One or more computer-readable storage devices comprising instructions that, when executed by one or more devices of a messaging system, cause the one or more devices to:
   output a messaging user interface having:
      an inbox to list incoming messages for a messaging account;
      a designated portion to enable interaction with multiple content channels, the designated portion configured to display items corresponding to the multiple content channels as a list of content channels that are distributed to the one or more devices as electronic messages and to which a user has previously subscribed to associate the multiple content channels with the messaging account; and
      a message display area configured to display both messages from the inbox and content channels from the list of content channels;
   pin a particular content channel as an item in the designated portion responsive to interaction of a user with a message for the particular content channel listed in the inbox to cause the item for the particlar content channel to appear in the designated portion each time the messaging user interface is employed to access the messaging account;
   detect an update that is available for the particular content channel; and
   update the messaging user interface to reflect the availability of the update by exposing an icon displayed in the list in proximity to the item corresponding to the particular content channel to provide a visual indication of the available update.

13. One or more computer-readable storage devices as described in claim 12, wherein:
   the designated portion is configured to expose the list of content channels including the item corresponding to the particular content channel; and
   the icon in the list is selectable to obtain the update for the particular content channel.

14. One or more computer-readable storage devices as described in claim 12, wherein the electronic message is an email, an instant message, or a text message that is received via one of said one or more devices.

15. One or more computer-readable storage devices as described in claim 12, wherein the particular content channel corresponds to a social network.

16. One or more computer-readable storage devices as described in claim 12, wherein the particular content channel corresponds to business entity.

17. A method performed using one or more computing devices of an electronic messaging system, the method comprising:
   distributing, to one or more clients, an electronic message including a content channel configured to integrate multiple content portions of different types and define arrangement of the multiple content portions one to another, the electronic message having data to enable each of the one or more clients to:

ascertain that the electronic message includes the content channel; and present the electronic message in an inbox of a respective messaging user interface with an identifier to identify the presence of the content channel and selectable to pin the content channel as an item in a designated portion of the respective messaging user interface configured to list content channels to which a user has subscribed;

detecting that an update is available for the content channel; and communicating the update to at least some of the one or more clients to cause an indication of the available update for the content channel to be exposed with the item in the designated portions of the respective messaging user interfaces.

18. A method as described in claim 17, further comprising enabling configuration of the content channel over a network via one or more services, the configuration including selecting of a distribution list, wherein the distributing comprises distributing the electronic message to messaging addresses described by the distribution list.

19. A method as described in claim 17, further comprising tracking subscribers to the content channel, wherein the at least some of the one or more clients to which the update is communicated correspond to the subscribers.

* * * * *

UNITED STATES PATENT AND TRADEMARK OFFICE
CERTIFICATE OF CORRECTION

PATENT NO. : 8,166,120 B2
APPLICATION NO. : 12/414380
DATED : April 24, 2012
INVENTOR(S) : Micheal C. Kunz et al.

It is certified that error appears in the above-identified patent and that said Letters Patent is hereby corrected as shown below:

In column 18, line 33, in Claim 12, delete "particlar" and insert -- particular --, therefor.

Signed and Sealed this
Ninth Day of October, 2012

David J. Kappos
*Director of the United States Patent and Trademark Office*